350-315
CROSS REFERENCE
SEARCH ROOM

Oct. 15, 1968 D. N. BROWN ETAL 3,406,085

PHOTOCHROMIC WINDOW

Filed May 11, 1964 2 Sheets-Sheet 1

INVENTORS
Donald N. Brown
Benjamin Justice
Thomas G. O'Leary
By Clarence R. Patty
ATTORNEY

PHOTOCHROMIC WINDOW

Filed May 11, 1964 2 Sheets-Sheet 2

INVENTORS
Donald N. Brown
Benjamin Justice
Thomas G. O'Leary
By Clarence R. Patty
ATTORNEY 3,406,085
PHOTOCHROMIC WINDOW Donald N. Brown, Benjamin Justice, and Thomas G. O'Leary, Corning, N.Y., assignors to Corning Glass Works, Corning, N.Y., a corporation of New York Filed May 11, 1964, Ser. No. 366,457
3 Claims. (Cl. 161—45)

ABSTRACT OF THE DISCLOSURE

This invention relates to photochromic glasses which are reversibly darkened through the action of actinic radiations having wave lengths within the range of about 3000–5500 A. More particularly, this invention relates to improving the proportionality of such glasses to solar radiation, i.e., improving the direct relationship existing between the extent of darkening and the intensity of solar radiation impinging thereon, by filtering part of the ultraviolet portion of the solar radiation incident thereon.

This invention relates to the manufacture of glass windows suitable for use in automobiles, homes, office buildings, and the like, which exhibit photochromic properties.

Photochromic or phototropic glasses, as they have been variously termed, are particularly characterized in that their optical transmittances decrease when exposed to actinic radiation but which return to their original state upon elimination of this radiation. Co-pending application, Ser. No. 213,634, now U.S. Patent No. 3,208,860, filed July 31, 1962 by W. H. Armistead and S. D. Stookey, discloses a wide variety of photochromic glasses and discusses some of the theoretical considerations involved in the mechanism of photochromic behavior. That application describes inorganic silicate glasses containing fine-grained inorganic crystals, preferably of the silver halide, silver chloride, silver bromide, and/or silver iodide, which become darkened to the transmission of visible light upon exposure to radiations having wave lengths of about 0.3–0.5 micron (3000–5000 A.) but which regain their original optical transmittance upon removal of the actinic radiation. In another copending application, Ser. No. 278,323, now U.S. Patent No. 3,325,299, filed May 6, 1963 by Roger J. Araujo, are disclosed other photochromic glass compositions wherein the crystals sensitive to actinic radiation of wave lengths between about 0.3–0.55 micron (3000–5500 A.) are composed of the halides, chloride, bromide, and/or iodide, of copper and/or cadmium. And in yet another copending application, Ser. No. 265,150, now U.S. Patent No. 3,293,052, filed Mar. 14, 1963 by Stanley D. Stookey and Loris G. Sawchuk, are described photochromic glass compositions wherein the crystals sensitive to actinic radiation of wave lengths between about 0.3–0.55 micron (3000–5500 A.) are composed of silver molybdate and/or silver tungstate. Although the variety of photochromic glasses which can be produced is quite large, the actual mechanism involved in the effect observed is not fully understood. It is believed to be dependent upon a reaction occurring between the actinic radiation and the crystals dispersed in the glassy matrix, this reaction altering the absorptive qualities of the crystals to visible radiation. However, as these crystals are contained in a glassy matrix, the removal of the actinic radiation allows the crystals to return to their original state since the glassy matrix is non-reactive and is impermeable to the reaction products resulting from such exposure so they cannot diffuse away. In any event, it is this ability to reversibly vary the transmittance of visible light which has recommended the use of such glasses in windows, walls, ophthalmic lenses, and the like.

While these glasses are of great utility for many applications, we have found that the amount of actinic radiation in sunlight is so abundant that even the oblique rays from the sun shortly after sunrise or shortly before sunset may be sufficient to cause substantially complete darkening of these glasses. Thus, although the glare or intensity of the visible radiation of the sun's light increases as the sun rises higher in the sky, the transmittance of these glasses remains relatively constant. This has led to much research to discover photochromic glasses exhibiting good proportionality to actinic radiation, i.e., glasses wherein the extent of optical darkening varies directly with the intensity of the incident radiation. Some success has been had through research in the choice of crystals sensitive to actinic radiation utilized in the glass. However, the products developed thereby have not been fully satisfactory so it has been necessary to select either a glass which is suitable for reducing the amount of sunlight at noon to a desired level but which, therefore, will transmit less sunlight than might be desired at other times of the day, or to select a glass which transmits a greater proportion of sunlight throughout the day but, in so doing, transmits more sunlight than is desirable during the noontime period.

Therefore, the primary object of this invention is to produce a window of photochromic glass in which there is better proportionality in the inverse relationship between the optical transmittance of the glass and the intensity of the actinic radiation incident thereon.

Another object of this invention is to produce decorative or functional patterns in sheets of photochromic glass utilized in windows or in lighting applications.

Still another object of this invention is to provide means for varying and controlling the transmittance of visible radiation through a window utilizing photochromic glass.

Other objects will become apparent from a consideration of the following description and drawings in which.

We have discovered that the principal object of this invention can be accomplished in a composite window structure comprising a pane of photochromic glass and means for filtering a portion of the actinic radiation incident thereon. As the photochromic glasses of the aforementioned applications contain crystals sensitive to radiation having wave lengths of about 0.3–0.55 micron, it is preferable for the purposes of this invention to filter out at least a portion of the radiation within such range of wave lengths which is not within the visible segment of the spectrum. Hence, it is preferred to utilize filters which are effective upon radiations having wave lengths of between about 0.3–0.4 micron (3000–4000 A.). We have found that such filtering can be effected through a wide variety of means including: positioning an auxiliary pane of glass between the pane of photochromic glass and the source of actinic radiation to produce a double-paned window, such as a double-glazed window or a laminated window, wherein the auxiliary pane is composed of a glass which absorbs ultra-violet light; utilizing a transparent film on the surface of a pane of photochromic glass between the glass and the source of actinic radiation which absorbs ultra-violet light or reflects preferentially in the ultra-violet segment of the spectrum; and incorporating constituents which absorbs ultra-violet radiation within the structure of the photochromic glass itself. Various combinations of these means are also possible as will be discussed hereinafter.

Figure 1:
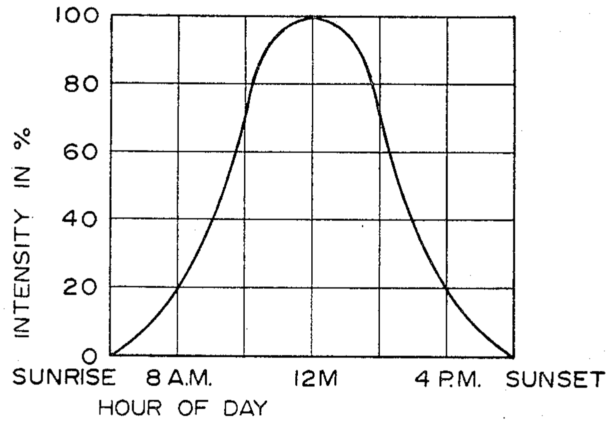
FIGURE 1 is a graph representing the intensity of actinic radiation in the sun's rays as a function of the hour of day.
Figure 2:
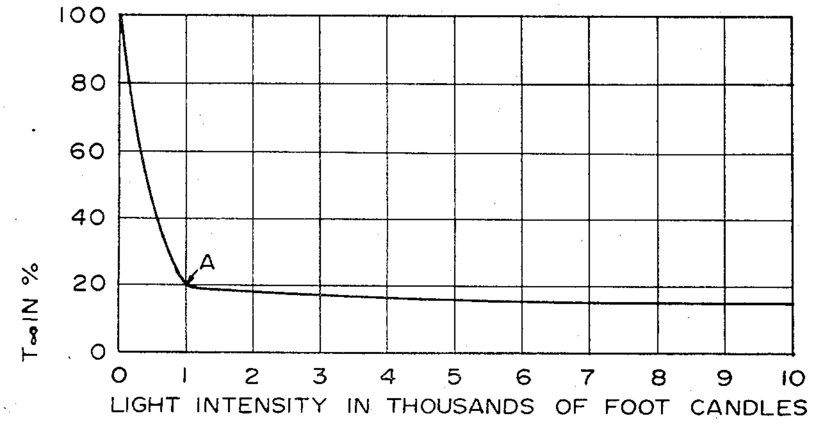
FIGURE 2 is a graph representing an average transmittance of visible radiation of photochromic glasses as a function of the intensity of actinic radiation incident thereon.
Figure 3:
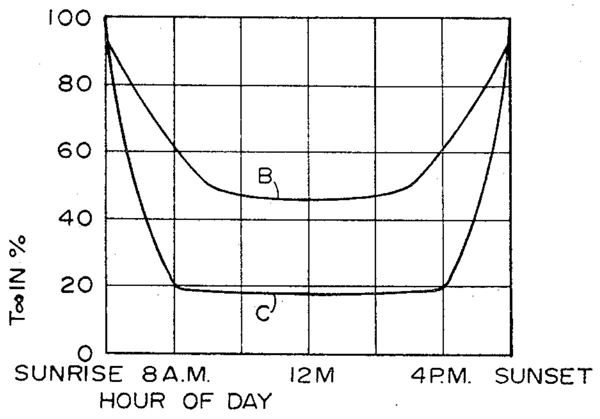
FIGURE 3 is a graph representing an average transmittance of visible radiation of photochromic glasses as a function of the hour of day.

The basic problem which the present invention is designed to solve can best be understood by a consideration of FIGURES 1, 2 and 3. FIGURE 1 represents a graph depicting the approximate intensity of the actinic radiation in sunlight as a function of the time of day based on a 12-hour day. It will be apparent, of course, that the absolute intensity of the sun's radiation will be dependent upon the season of the year, the location of the point of measurement, and the atmospheric conditions prevailing at the moment of measurement. Nevertheless, the general shape of the curve will be essentially the same without regard to any of these conditions. This curve illustrates that the intensity of the radiation varies with the time of day, increasing with the elevation of the sun above the horizon.

FIGURE 2 sets forth the relationship existing between the steady-state transmittance ($T\infty$) of typical photochromic glasses at 20° C. of the aforementioned patent applications and the intensity of the actinic radiation incident thereon. The optical transmittance of a transparent photochromic glass before darkening is similar to that of window glass. On exposure to light of a given intensity (temperature being held constant) the optical density measured at a given wave length in the visible spectrum—and similarly, the total luminous absorption—increases exponentially, approaching a constant equilibrium value. As employed herein, "steady-state transmittance" is defined as the transmittance of visible radiation by the glass after it has been exposed to actinic radiation of a constant intensity for a sufficient length of time to permit its percent transmittance to assume a constant value. This graph clearly illustrates that the glass becomes saturated, that is, it does not respond by becoming appreciably darker or more opaque to greater intensities of actinic radiation when point A is reached, whereas the intensity of actinic radiation in the sun's rays for the majority of the day, substantially from about one hour after sunrise to about one hour before sunset on a clear day, exceeds the saturation intensity of the photochromic glass. Our laboratory experimentation has demonstrated that by decreasing the intensity of a portion of the solar actinic radiation which strikes the photochromic crystals within the glassy matrix it is possible to modify the sensitivity of the glass and improve its responsiveness to changes in the intensity of the sun's rays through the whole day. FIGURE 3 records the results of our invention. Herein the steady-state transmittance of visible radiation of a particular glass is plotted against the time of day based upon a 12-hour day. Curve B represents a window made in accordance with this invention and illustrates the responsiveness of this window to the variation in sunlight intensity throughout the day. Curve C reflects the limited responsiveness of windows utilizing only panes of the photochromic glasses of the above-mentioned applications, graphically demonstrating that these become saturated shortly after sunrise and remain so until shortly before sunset.

Figure 4:
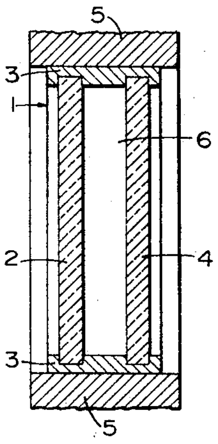
FIGURE 4 is a sectional illustration of the preferred embodiment of this invention.

Although the proportion of actinic radiation in the sun's rays which is permitted to impinge upon the photochromic glass can be controlled through many devices, including those procedures outlined above, the preferred embodiment of this invention is illustrated in cross-section in FIGURE 4. In this drawing, a window 1 is comprised of a pane of photochromic glass 2 held within a surrounding frame 3 and a pane of ultra-violet absorbing glass 4 also held within the frame 3. The window 1 is positioned in the structure 5, wherein it will be utilized in such manner that the pane 4 is on the outside of the structure 5, i.e., so that under normal conditions pane 4 will face the sun and the rays from the sun must pass therethrough before striking the photochromic glass pane 2. It is often desirable to include an airspace 6 between the panes for insulating purposes as is shown in this figure.

Figures 5, 7:
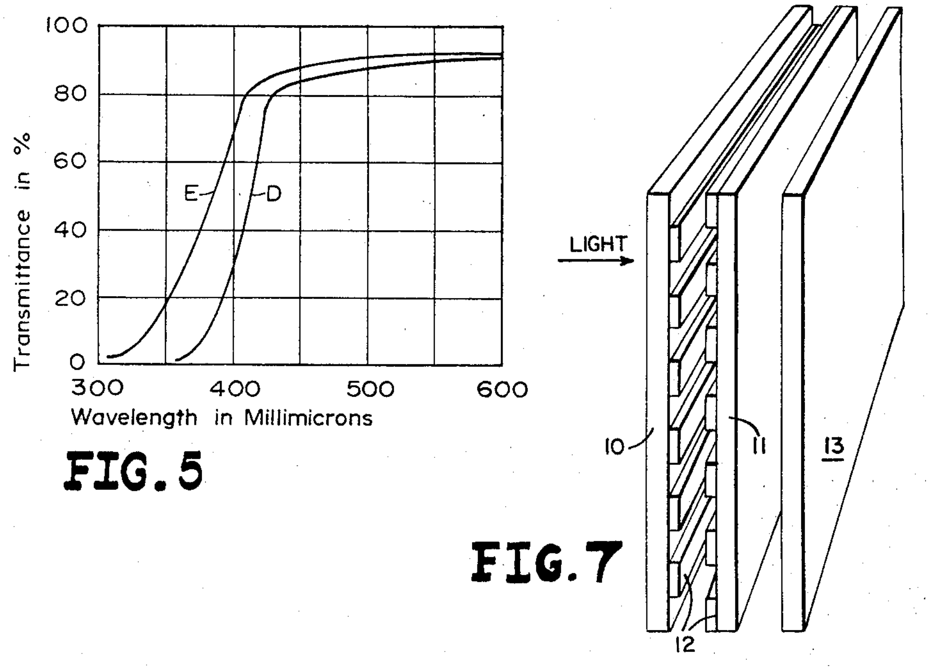
FIGURE 5 is a graph setting forth the percent transmittance of two different glass panes at various wave lengths of radiation.
FIGURE 7 represents a perspective exploded view of still another embodiment of this invention.

Pane 4 can be made of any transparent glass as all glasses absorb some of the actinic radiation and, hence, would lend at least a small improvement in the responsiveness of the photochromic glass. However, the primary object of this invention is achieved much more satisfactorily by utilizing a glass which is essentially transparent to visible radiation but preferentially absorbs a substantial amount of the ultra-violet radiation. A glass which has been found to be particularly suited for this purpose is a glass marketed by Corning Glass Works as Code No. 3060. It can be observed from a consideration of FIGURE 5, in which the percent transmittance of a glass plate 2 mm. in thickness is plotted against the wave length of the radiation, that the transmittance of this particular glass (Curve D) in the ultra-violet segment of the spectrum, i.e., below 4000 A., is substantially less than that of a standard soda lime glass of the type conventionally used for glazing purposes, as recorded in Curve E. However, in removing the ultra-violet portion of the actinic radiation from the sun's rays, the intensity of the overall radiation is reduced to such an extent that, in many instances, the photochromic glass does not darken to the same extent as when the full range of solar radiation is incident thereon.

One modification in the structure of the double glazed window for architectural use described above which rectifies this phenomenon involves the use of a revolving window frame. Two glass panes are laminated or joined in a standard insulating window with a sealed air space between the panes. The window can be rotated such that the inner pane becomes the outer pane and vice versa. One of these panes is a glass which absorbs most of the ultra-violet radiation from the sunlight below 4000 A. The other pane is of photochromic glass. Thus, with the ultra-violet absorbing pane facing the sunlight, the responsiveness of the unit to the sun's radiations is altered. However, if the intensity of the sunlight is so great as to cause discomfort, the window can be turned 180° so that the photochromic glass faces the sun and the full darkening of this glass can be obtained.

Figure 6:
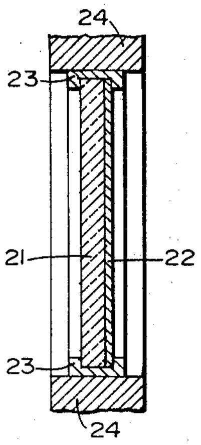
FIGURE 6 represents a sectional illustration of yet another embodiment of this invention.

FIGURE 6 illustrates, in cross-section, a second embodiment of this invention wherein a window 20 is comprised of a pane of photochromic glass 21 having on one surface thereof a film 22, shown in greatly exaggerated thickness, which is transparent to visible radiation but which decreases the intensity of the actinic radiation in the transmitted radiation, either by absorption or reflection, in a surrounding frame 23. The window 20 is placed within the opening of a building 24 or similar structure so that the film 22 is on the outside thereof and thereby decreases the intensity of the actinic radiation in the sun's rays before the solar radiation impinges upon and darkens the photochromic glass pane 21. A suitable film for this purpose is an iron oxide film applied in a thickness equivalent to a one-quarter wave length filter for 3600 A. radiation. Such a film can be produced readily by fuming an aqueous solution of a hydrolyzable iron salt, such as ferrous chloride, on the surface of the photochromic glass which has been heated to about 500° C.

A third modification in window structure which enables the performance of photochromic glasses to be controlled resides in the use of movable ultra-violet radiation-absorbing patterns in multiple glazed windows. This is demonstrated in FIGURE 7, an exploded perspective view of a window structure wherein the outer and middle panels 10 and 11, respectively, are coated or stained in a louver design which will transmit or filter ultra-violet radiation by moving the middle panel. Such a design could be applied by silk screening or other convenient method using clear organic coatings that absorb ultra-violet radiation. Thus, the ultra-violet absorbing louvers 12, shown in greatly exaggerated thickness, are on the inside surface of the outside pane and on the outside surface of the inside pane. It has been demonstrated in a window assembly of this type that when the middle pane 11 is positioned so that the louvers of outer and middle panes complement each other providing complete filtering of the ultraviolet radiation, the pane of photochromic glass 13 will demonstrate better proportionality to the intensity of solar radiation. However, by placing the louvers in open position, i.e., the middle pane 11 is positioned so that the louvers therein correspond to the louvers in the outer pane 10, the pane of photochromic glass 13 will be subjected to both direct and filtered actinic radiation and, therefore, will darken to a greater extent than when the louvers are in closed position. It can be appreciated that there are many variations in pattern and motion which will modify the amount of ultra-violet radiation being admitted and, hence, the amount of darkening of the photochromic glass. In other words, the motion can be vertical, horizontal, or normal to the plane of the glass.

For some applications, a window comprising a laminate of a pane of ultra-violet radiation-absorbing glass affixed to a pane of photochromic glass may be useful. Such a window can be manufactured by adhesively attaching the panes together by a plastic layer as is well known in the art or the lamination may be done more economically by running a hot sheet of each glass from vertically parallel orifices through one set of rollers, these sheets being sufficiently soft to stick together as a unitary structure. Of course, these two glasses would have to be closely matched in their thermal expansion.

Although this embodiment of the invention has been discussed in the light of employing a glass which absorbs ultra-violet radiation, it will be appreciated that sheets of organic plastics may be used in free form or laminated to the photochromic glass or various films which absorb ultra-violet radiation may be applied to the glass.

Still another variation of the utilization of a laminate comprising an ultra-violet absorbing medium and a photochromic glass can be produced by developing a surface layer in situ exhibiting photochromic behavior on an ultra-violet radiation-absorbing glass through ion exchange as, for example, the exchange of silver ions for alkali metal ions to yield radiation-sensitive silver halide crystals described by Armistead and Stookey in the above-cited patent application. As explained therein the glass surface is contacted with a material containing silver or silver compounds and thereafter heated to effect the exchange of silver ions for alkali metal ions.

A still further means for removing the ultra-violet portion of the actinic solar radiation before it can cause darkening of the glass and thereby saturate the photochromic glass prematurely is to incorporate ultra-violet-absorbing constituents in the glass-forming batch materials. Many oxide constituents are known to absorb ultra-violet radiations when present in glass. Among these are $CeO_2$, $V_2O_5$ and $Fe_2O_3$. While considerable amounts of these oxides can be included in photochromic glasses without deleteriously affecting the photochromic properties thereof, it is preferable to limit the additions, on the weight percent basis, to 2% $CeO_2$, 0.3% $V_2O_5$, and 0.1% $Fe_2O_3$, as greater amounts tend to absorb in the visible portion of the spectrum to an undesirable degree and also tend to reduce the silver in the glass to metallic silver. While the above-stated constituents are effective in producing the desired filtering effect of ultra-violet radiation, their presence within the glass results in varying degrees of coloration in the glass. However, a particularly desirable glass pane can be produced by including in the composition thereof, on the weight percent basis, 0.1–0.3% $V_2O_5$ and 0.05–0.3% $As_2O_3$, the ratio of $V_2O_5$ to $As_2O_3$ being between 0.5–1.0. The presence of arsenic oxide in addition to the vanadium pentoxide changes the brownish coloration resulting from the $V_2O_3$ alone to a pleasing faint blue-green. A particularly suitable composition for such a glass pane, analyzed in weight percent with the halogen content being stated in excess of 100% in accordance with conventional practice, is that given below:

| | Percent |
|---|---|
| $SiO_2$ | 58.9 |
| $Al_2O_3$ | 9.3 |
| $Na_2O$ | 10.1 |
| $K_2O$ | 1.0 |
| $B_2O_3$ | 19.9 |
| Ag | 0.45 |
| CuO | 0.03 |
| $As_2O_3$ | 0.1 |
| $V_2O_5$ | 0.2 |
| $F^-$ | 1.45 |
| $Cl^-$ | 0.6 |

Photochromic glasses containing ultra-violet radiation-absorbing ingredients are produced in like manner to that described in the above-noted patent applications, the specific example cited being of the type particularly described by Armistead and Stookey.

We claim:

1. A photochromic glass window responsive to actinic radiation of wave lengths between about 3000 A.–5500 A. and exhibiting improved proportionality to solar radiation incident thereon comprising
   (a) an inner pane of photochromic glass responsive to actinic radiation of wave lengths between about 3000 A.–5500 A.,
   (b) an outer front auxiliary means for filtering a substantial part of the ultra-violet portion of the solar radiation adjacent said pane of photochromic glass, and
   (c) support means for holding said pane of photochromic glass and said auxiliary means in fixed relation to each other whereby the incident solar radiation must first impinge upon and pass through said auxiliary means before exposing said photochromic pane.

2. A photochromic glass window according to claim 1 wherein said outer auxiliary means for filtering ultra-violet radiations comprises a pane of glass which absorbs a substantial amount of the radiation having wave lengths between about 3000 A.–4000 A. and said support means comprises a frame for holding said pane of photochromic glass in said pane of ultra-violet absorbing glass in substantially parallel fixed relation.

3. A photochromic glass window according to claim 1 wherein the part of the ultra-violet radiation filtered has wave lengths between about 3000–4000 A.

References Cited

UNITED STATES PATENTS

| | | | |
|---|---|---|---|
| 1,957,279 | 5/1934 | Linke. | |
| 2,186,203 | 1/1840 | Centeno. | |
| 2,444,976 | 7/1948 | Brown. | |
| 2,856,303 | 10/1958 | Armistead | 106—53 |
| 2,964,427 | 12/1960 | Rheinberger et al. | 117—33.3 |
| 3,208,860 | 9/1965 | Armistead et al. | 106—54 |
| 3,269,267 | 8/1966 | Collins | 88—112 |
| 3,278,319 | 10/1966 | Cohen | 106—52 |

ROBERT F. BURNETT, *Primary Examiner.*

W. A. POWELL, *Assistant Examiner.*